Nov. 27, 1934.    J. E. SMITH    1,982,358
METHOD FOR EXTERMINATING MOTHS
Filed Nov. 21, 1932
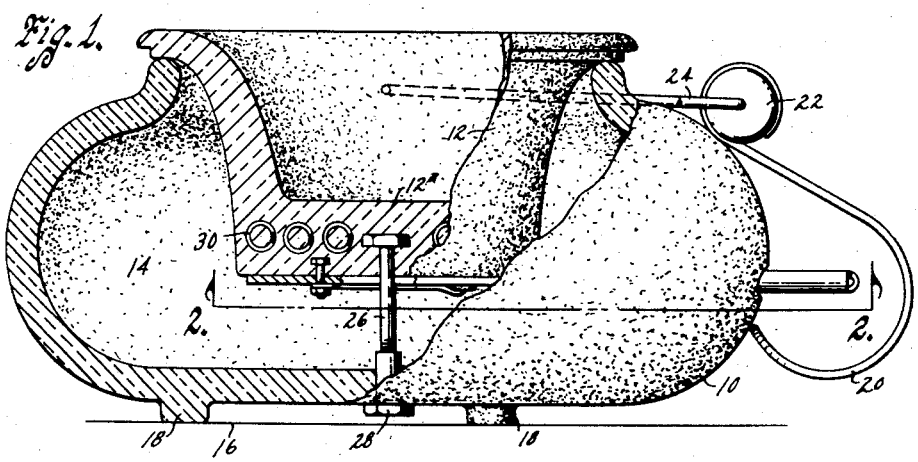
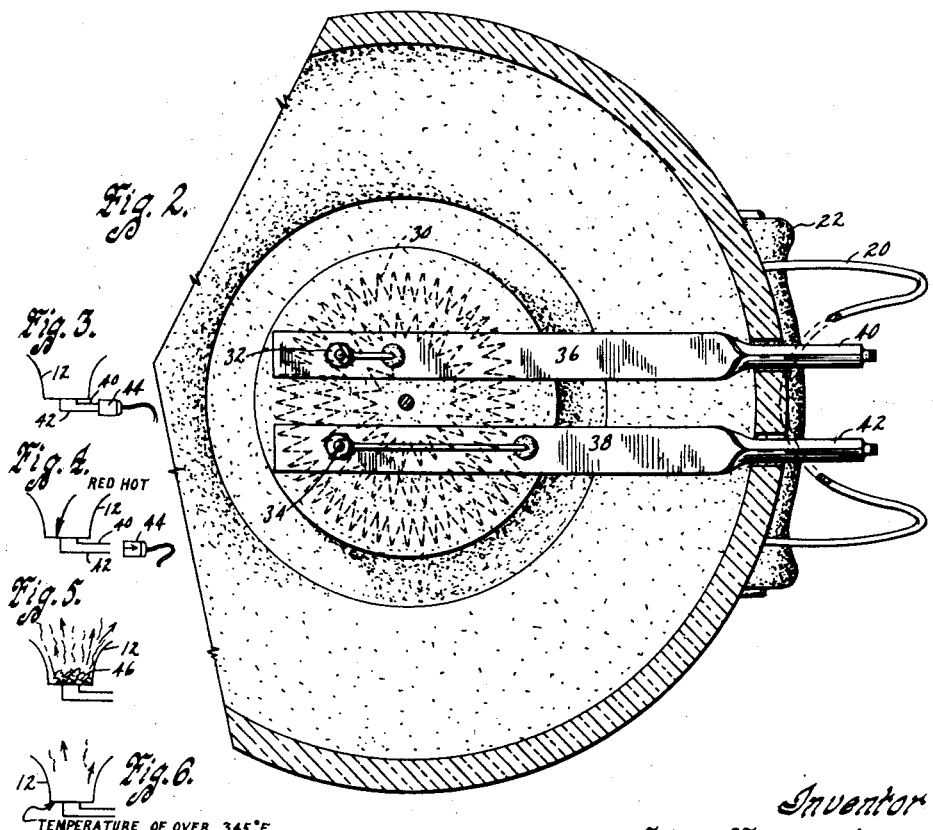
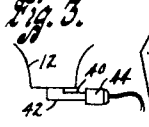
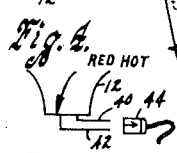
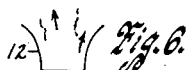
Inventor
~ John E. Smith ~
By Bair, Freeman & Sinclair
Attorneys
Witness
H. S. Mungenmaier Patented Nov. 27, 1934

1,982,358

UNITED STATES PATENT OFFICE 1,982,358

METHOD FOR EXTERMINATING MOTHS

John E. Smith, Belleville, Ill., assignor to Knapp-Monarch Company, Belleville, Ill., a corporation of Missouri Application November 21, 1932, Serial No. 643,619

1 Claim. (Cl. 43—129)

The object of my invention is to provide a method for exterminating moths, especially clothes moths and their larvæ, the method being comparatively simple and inexpensive to practice.

Still a further object is to provide a method for evaporating chemicals, such as insect exterminating chemicals, with the evaporation taking place quickly and completely.

Still a further object is to provide an apparatus which can be used for performing the process.

With these and other objects in view my invention consists in the method and its performance, whereby the objects contemplated are attained, as hereinafter more fully set forth, pointed out in my claim, and illustrated in the accompanying drawing which shows an apparatus for performing the method and in which:

Figure 1 is a side elevation, partly in vertical section, of an apparatus for practicing my method of exterminating moths.

Figure 2 is a sectional view on the line 2—2 of Figure 1; and

Figures 3, 4, 5 and 6 are diagrammatic figures showing steps of the process.

My process involves the evaporation of an insect exterminating chemical such as paradichlorobenzene for exterminating insects by killing them, the process being especially adaptable for exterminating clothes moths and their larvæ. In 100 cubic feet of clothes closet space, two ounces of paradichlorobenzene, if evaporated quickly, is sufficient to exterminate any moths and their larvæ in the closet. With less concentration, a greater quantity of the chemical must be used for the same space.

To obtain a maximum of concentration, the chemical must be very quickly evaporated. Paradichlorobenzene has a boiling point of 345° F. Its latent heat of evaporation is 115 B. t. u.'s per lb. Accordingly, in order to evaporate two ounces of the chemical, approximately 15 B. t. u.'s of heat must be applied directly thereto to accomplish complete evaporation.

I have provided an apparatus which I will now describe with which it is possible to perform the process of evaporating the paradichlorobenzene which I claim. The apparatus includes an outer container 10 and an inner receptacle 12. The container 10 serves merely as a support for the receptacle 12 and provides an air space 14 between them to prevent the ready transmission of heat from the receptacle 12 to a floor surface 16 or to the surrounding atmosphere. The container 10 may be provided with projections 18 whereby the container may rest on the floor surface 16, or the device can be hung on a coat hanger rack or the like by means of a hook 20. The hook 20 is secured to a handle 22, which in turn is pivoted on a bail 24 whereby the appliance can be moved from one place to another by an operator engaging the handle.

The container 10 is preferably of glazed argillous material while the receptacle 12 is preferably of unglazed argillous material. The two are held assembled relative to each other by means of a bolt 26 and a nut 28.

The bottom 12a of the receptacle 12 has embedded therein a resistance coil or heating element 30. The ends of the heating element 30 extend to terminals 32 and 34 which retain current conducting bars 36 and 38 in position against the bottom 12a. The bars 36 and 38 have prongs 40 and 42 to which an electric plug 44 (see Figure 3) can be associated for conducting current to the heating element 30.

*Performing my method of exterminating insects*

In performing my method, the plug 44 is first connected with the prongs 40 and 42, as shown in Figure 3, whereupon the heating element 30 will be energized and the connection is left in this position until the bottom 12a of the receptacle 12 becomes "red" hot. The plug 44 is then disconnected as shown in Figure 4 and immediately paradichlorobenzene crystals or flakes 46 are placed in the receptacle 12, as shown in Figure 5.

The residual heat of the receptacle and its bottom 12a will immediately act upon the crystals to evaporate them. Finally, when they are all evaporated, as in Figure 6, the temperature of the bottom 12a will be over 345° F.

Several things which will now be enumerated are necessary in order to practice the process just outlined.

In addition to the 15 B. t. u.'s of heat which must be imparted to the two ounces of crystals 46 to cause their evaporation, additional heat must be imparted from the heating element 30 to the receptacle 12 so as to take care of any heat lost by radiation which does not act upon the crystals to evaporate them. The volume of the material forming the receptacle 12 must be sufficient to absorb enough heat from the element 30 to evaporate the crystals 46 and still be at a temperature over their evaporation point when the evaporating process is finished. Otherwise, the evaporating process would not be completed and some of the chemical would remain in the receptacle 12. This chemical, the next time the device was heated for use, would give off an undesirable odor of the chemical, which odor is not given off if the chemical is initially evaporated quickly and completely.

Reference is made in the claim to heating the receptacle 12 to a predetermined temperature. In order that it be unnecessary for the operator to use a thermostat or thermometer for this purpose, the parts are so designed and proportioned that the proper temperature is reached when the bottom 12a becomes "red" hot, the temperature at that time being such that the required 15 B. t. u.'s for evaporation of the chemical has been stored in the receptacle plus the B. t. u.'s required for undesired but unavoidable radiation of heat from the receptacle.

The nature of the material forming the receptacle 12 together with its volume must also be taken into consideration and I have found that unglazed argillous material of about the actual size shown on the drawing is the proper material and size to accommodate about two ounces of the chemical. For larger quantities, the proportions can be changed, but the two ounce quantity will take care of most clothes closets and when they are larger, two or more applications of the process can be performed to effectively exterminate the moths and larvæ in the closet.

A process of exterminating moths as I have outlined is much superior to one of the present day processes in which the crystals are evaporated by blowing a current of air through them by a vacuum cleaner fan or the like.

Such a process involves considerable time and the desired concentration cannot be secured with the same quantity of chemical as when the chemical is quickly evaporated as by my process.

Changes can be made in performing the steps of my process and yet the real spirit and purpose of my invention will not be departed from. Accordingly, it is my intention to cover by my claim, any modified forms of the process or use of equivalent steps which may be reasonably included within its scope.

I claim as my invention:

A method for exterminating moths and the like comprising, first, the heating of a receptacle formed of pottery and having a predetermined volume of material therein to a red hot condition and, second, the placing of a predetermined amount of exterminating chemical therein to be evaporated by the heat therefrom, said pottery receptacle, said predetermined volume of material and the temperature attained by heating said receptacle to a red hot condition being such as to evaporate said chemical without such evaporation cooling said receptacle to a temperature below the boiling point of the exterminating chemical.

JOHN E. SMITH.